J. E. ATWOOD.
PULLEY COUPLING.

No. 109,709. Patented Nov. 29, 1870.

Witnesses:
Fred. Haynes
J. W. Coombs

Inventor
John E. Atwood
per Brown Coombs
Attorneys

United States Patent Office.

JOHN E. ATWOOD, OF MANSFIELD, CONNECTICUT.

Letters Patent No. 109,709, dated November 29, 1870.

IMPROVEMENT IN PULLEY-COUPLINGS.

The Schedule referred to in these Letters Patent and making part of the same.

*To all whom it may concern:*

Be it known that I, JOHN E. ATWOOD, of Mansfield, in the county of Tolland and State of Connecticut, have invented a new and useful Improvement in Pulley Couplings; and I do hereby declare that the following is a full, clear, and exact description of the same, reference being had to the accompanying drawing forming part of this specification, in which—

Similar letters of reference indicate corresponding parts.

Figure 1:
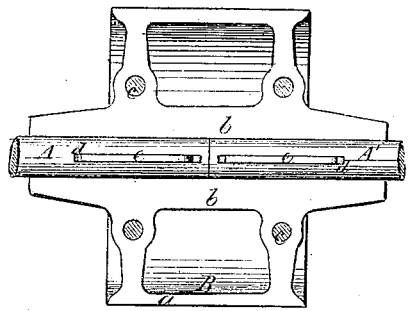
Figure 1 is an axial section of a pulley-coupling, constructed in accordance with my invention, the plane of section being between the halves of the pulley.
Figure 2:
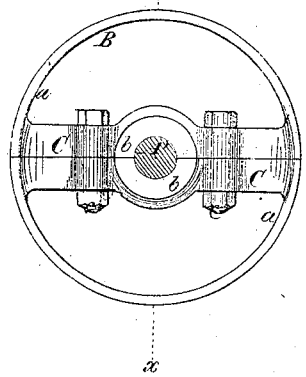
Figure 2 is a side view of the same.

This invention consists in a novel construction of the pulley, and the mode of securing the same to the shaft, whereby a stronger coupling is obtained with lighter materal, than in pulley-couplings of ordinary construction; and It further consists in a novel system of blind-keying, whereby the driving of keys is dipensed with and their displacement effectually prevented, while the shaft is not unnecessarily weakened by the key-ways.

To enable others to construct pulley-couplings in accordance with my invention, I will proceed to describe the same with reference to the drawing.

A A' are two portions of a shaft, the couphng of which is formed by the pulley B.

This pulley is divided through its axis in halves, each of which is provided, close to its dividing plane, with arms C C, which serve to connect the rim $a$ of the pulley, with the hub $b$ of the same, and at the same time allow the pulley to be firmly clamped upon and secured to the shaft A A', where it is to be coupled by screw-bolts $c\ c$ passing through said arms at each end of the hub and rim of the pulley.

Key-ways $d\ d$ are cut in the circumferential surface of the shaft A, to correspond with similar key-ways cut in the inner surface of the hub $b$, extending from near the middle to within a short distance from the ends of the hub.

Figure 3:
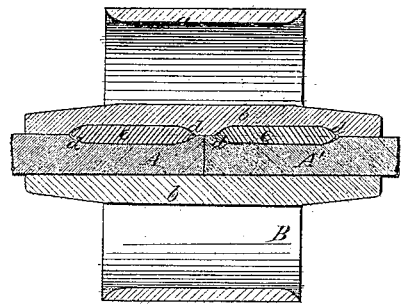
Figure 3 is an axial section at right angles to fig. 1, as indicated by the line $x\ x$ in fig. 2.

The ends of these key-ways are all rounded or tapered to the surface of the shaft and bore of the hub, as shown in fig. 3, and present no openings at the end of the shaft or hub, and the keys $e\ e$, which are of corresponding form, are placed into them before the two portions of the pulley are bolted together on the shaft.

By this construction and arrangement of blind-keying the driving of keys is dispensed with, and the shaft and hub are less weakened than when the key-ways extend through the ends.

By arranging the arms C C on the hub and rim of the pulley, near both ends of the latter, and close to the dividing-plane of the halves of the pulley, and so allowing screw-bolts to be passed through said arms for the purpose of securely uniting the halves of the divided pulley and clamping them to the shaft, I dispense with separate bolt-lugs, such as are commonly used in pulley-couplings, besides the arms or web which connect the rim with the hub, and am thus enabled to obtain the same strength and security with less material.

What is here claimed, and desired to be secured by Letters Patent, is—

The insertion of the keys $e\ e$ in recesses $d\ d$ in the shaft A and hub $b$, in such manner that they act as dowels to prevent the rotation of the one within the other, and to prevent the withdrawal of the shaft endwise from the eye of the pulley, substantially as shown and described.

JOHN E. ATWOOD.

Witnesses:
EUGENE ATWOOD,
ALFRED HARVEY.